(12) United States Patent
Wang et al.

(10) Patent No.: US 7,848,641 B2
(45) Date of Patent: Dec. 7, 2010

(54) DIGITAL CAMERA WITH LEFT- OR RIGHT-HANDED OPERATION

(75) Inventors: Wei-Jen Wang, Taipei Hsien (TW); Chia-Hung Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 189 days.

(21) Appl. No.: 12/202,325

(22) Filed: Sep. 1, 2008

(65) Prior Publication Data
US 2009/0252490 A1 Oct. 8, 2009

(30) Foreign Application Priority Data
Apr. 3, 2008 (CN) ........................ 200810300839.1

(51) Int. Cl.
*G03B 17/02* (2006.01)
(52) U.S. Cl. ...................................... 396/540; 348/376
(58) Field of Classification Search ................. 396/502, 396/540, 541, 299, 423–425, 535; 348/373, 348/376
See application file for complete search history.

(56) References Cited
U.S. PATENT DOCUMENTS 4,208,113 A * 6/1980 Prochnow .................... 396/502
4,493,542 A * 1/1985 Ohmura et al. ............. 396/541
5,946,512 A * 8/1999 Lavine et al. ................ 396/423
7,137,703 B2   11/2006 Weigel
7,151,571 B2 * 12/2006 Yip ............................ 348/373
2007/0053682 A1 * 3/2007 Chang ........................ 396/429

FOREIGN PATENT DOCUMENTS

JP          02226239 A   *   9/1990

* cited by examiner

*Primary Examiner*—Christopher E Mahoney
*Assistant Examiner*—Autumn Parker
(74) *Attorney, Agent, or Firm*—Zhigang Ma

(57) ABSTRACT

A digital camera has a housing and an exposure circuit in the housing. The digital camera further includes a locating post fixed on the housing, a rotatable assembly, and a shutter button electronically connected to the exposure circuit. The rotatable assembly has a hole for passage of the locating post and can rotate round the locating post. The shutter button is disposed on a side of the rotatable assembly. The rotatable assembly may help users to select one of the left side and the right side of the digital camera as desired for left-handed or right-handed operation of the digital camera.

7 Claims, 7 Drawing Sheets

DIGITAL CAMERA WITH LEFT- OR RIGHT-HANDED OPERATION

BACKGROUND

1. Technical of the Invention

The present invention relates to a digital camera, and, in particular, to a digital camera convenient for left- or right-handed operation.

2. Description of Related Art

Conventionally, many digital cameras are designed with right-handed users in mind, thus many function buttons, such as the a shutter button, are arranged on a camera conveniently only for right-handed operation. However, operation of such digital camera is inconvenient for a left-handed person.

It is desired to provide a digital camera having two shutter button positions, which can overcome the above-described deficiency.

SUMMARY

In accordance with an embodiment of the present invention, a digital camera has a housing and an exposure circuit in the housing. The digital camera further includes a locating post fixed on the housing, a rotatable assembly, and a shutter button electronically connected to the exposure circuit. The rotatable assembly has a hole for passage of the locating post and can rotate round the locating post. The shutter button is disposed on a side of the rotatable assembly.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF EXEMPLARY EMBODIMENTS

A detailed explanation of a digital camera according to an exemplary embodiment of the present invention will now be made with reference to the drawings attached hereto.

Figure 1A:
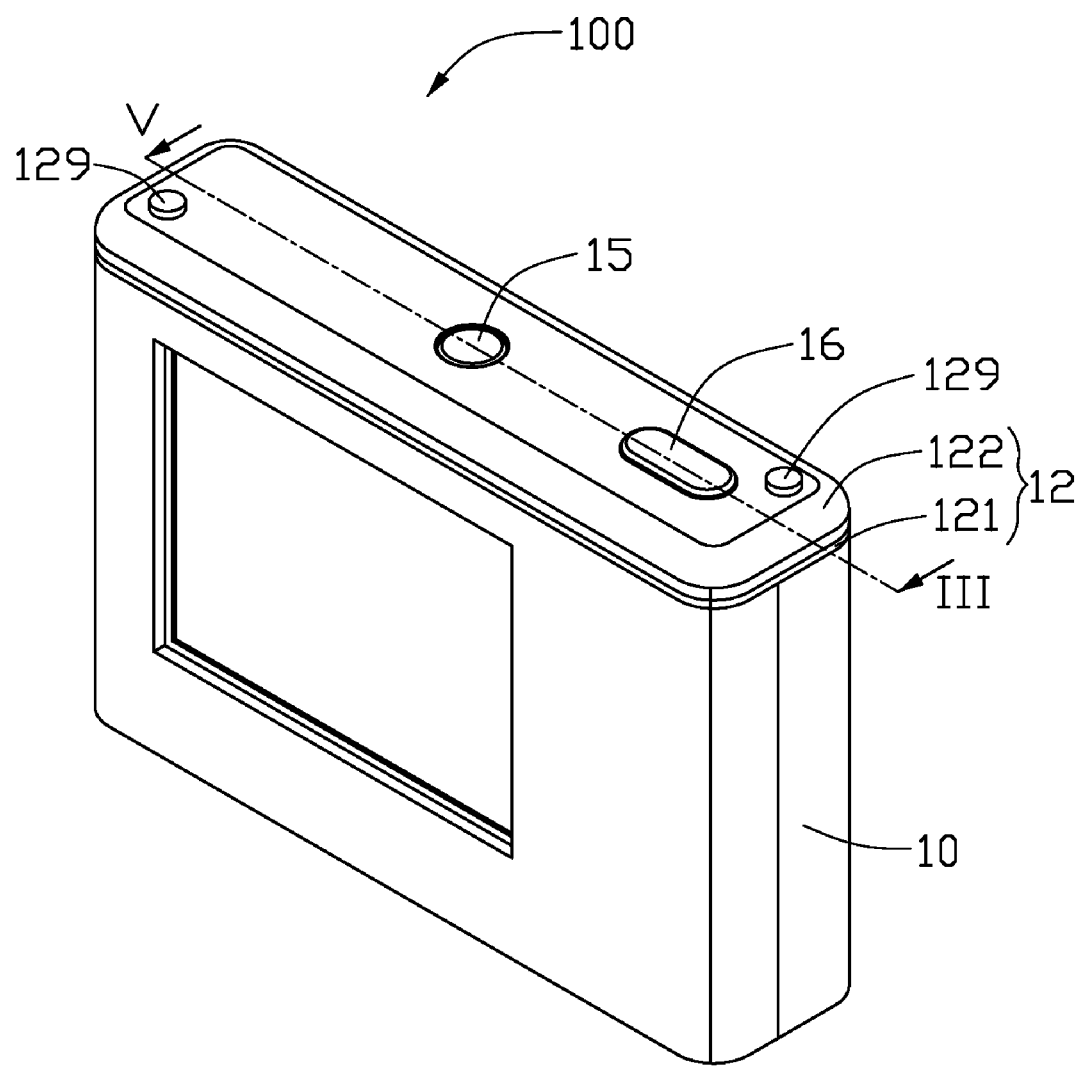
FIGS. 1A-1C show an isometric view of a digital camera at different operation position according to an embodiment.
Figure 1B:
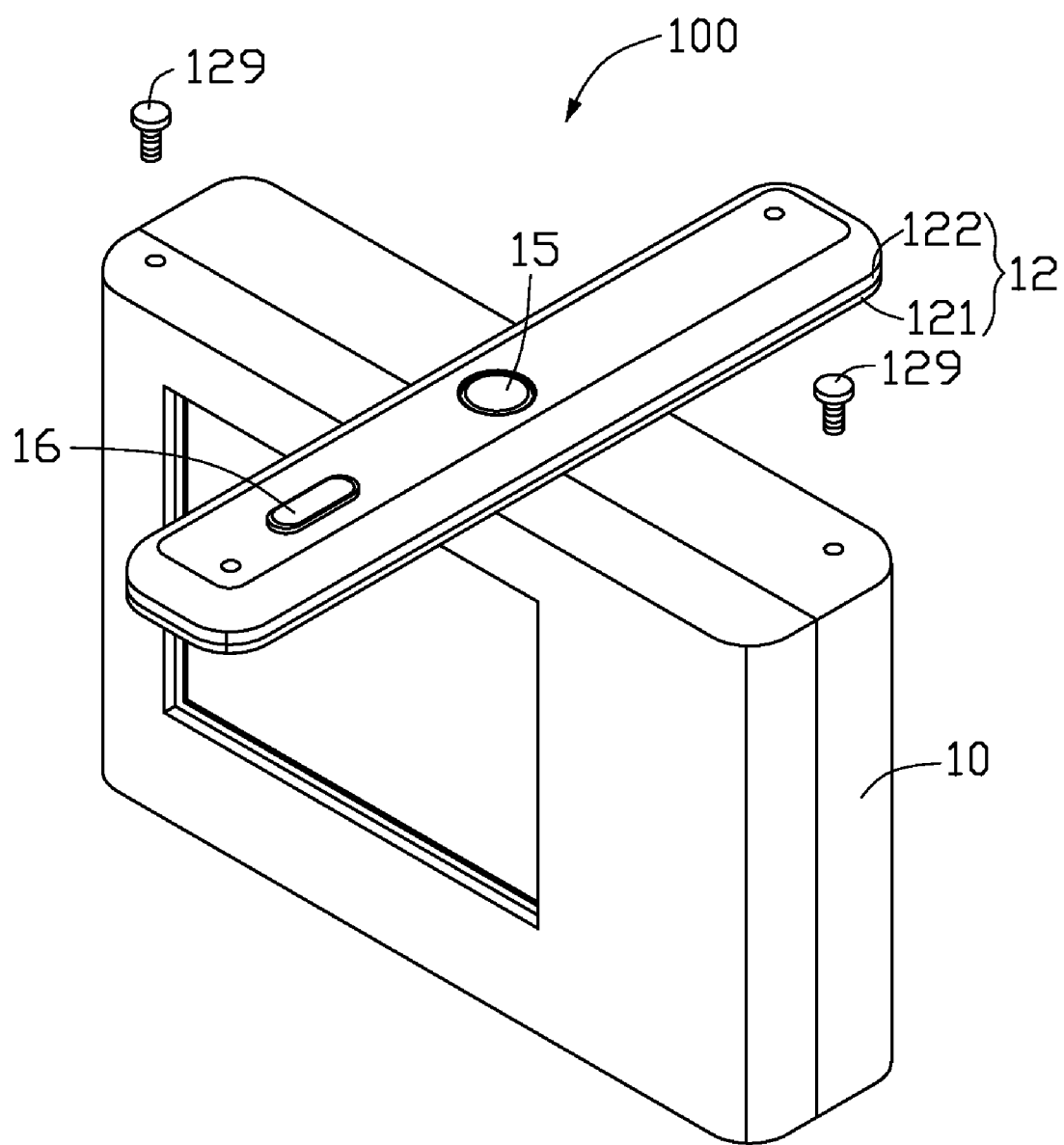
Figure 1C:
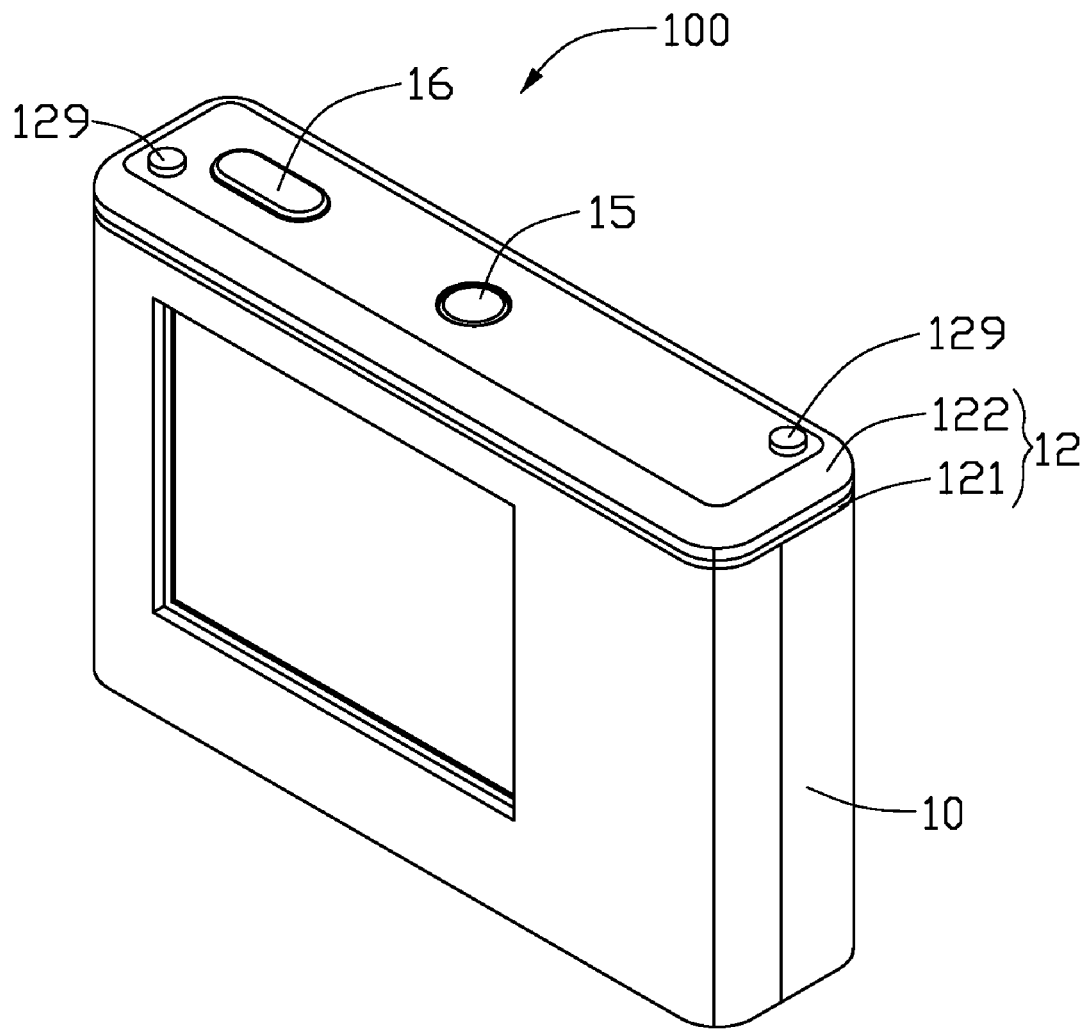
Figure 2:
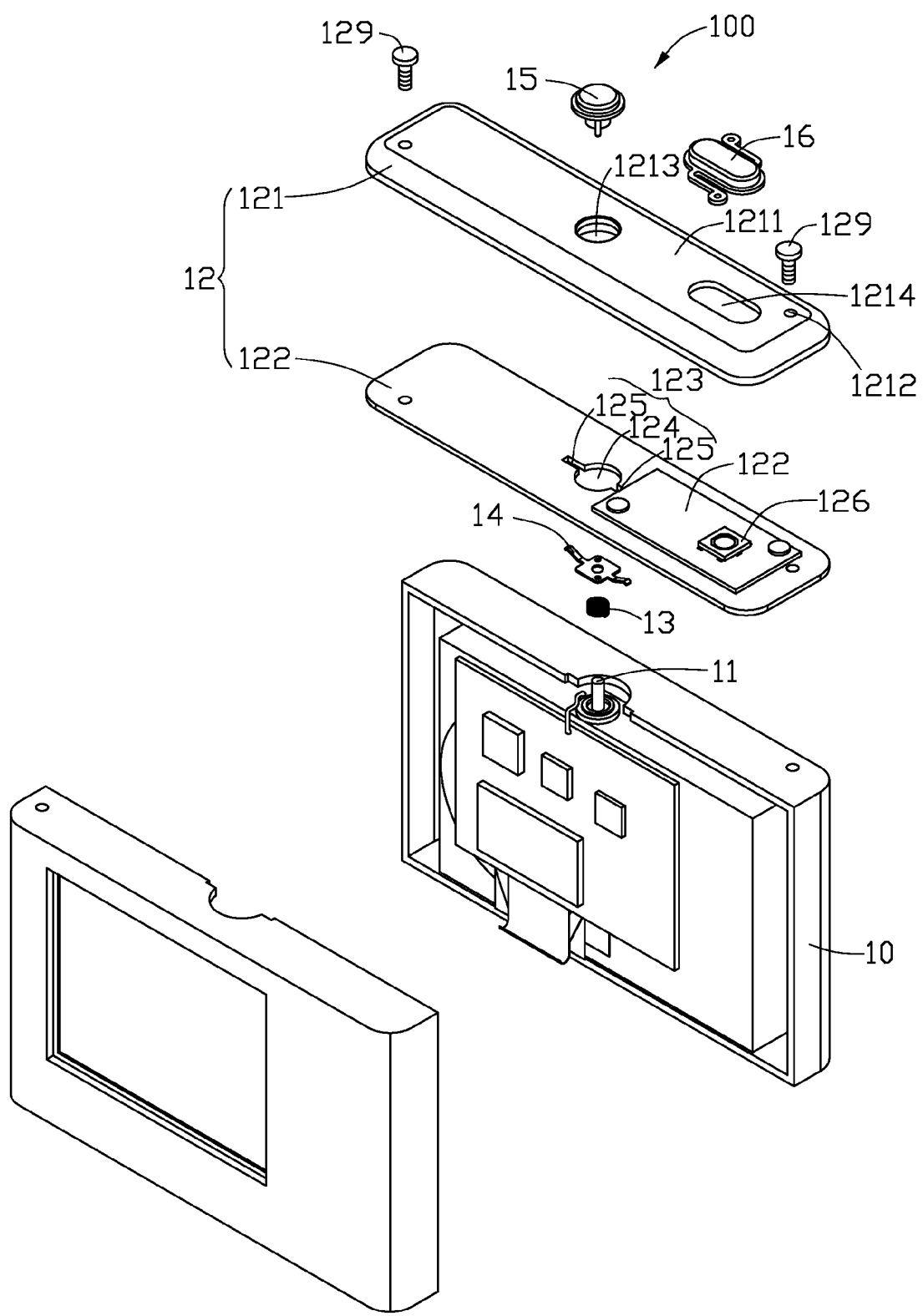
FIG. 2 is an exploded, isometric view of the digital camera of FIG. 1A.

Referring to FIGS. 1A, 1B, 1C and 2, a digital camera 100 according to an embodiment is shown. The digital camera 100 includes a housing 10, a locating post 11, a rotatable assembly 12, an elastic element 13, a contact sheet 14, a pivot release 15, and a shutter button 16. FIGS. 1A-1C show the rotating assembly 12 of a digital camera 100 first in a right-hand operation position, then being rotated to a left-hand operation position, and finally in the left-hand operation position.

The housing 10 is configured for holding and protecting camera components, such as, a touch screen, a lens assembly, and so on therein.

The digital camera 100 includes a focusing circuit, an exposure assembly, a zoom code input circuit, a main circuit board, and a central processing unit (CPU) (not shown). These electronic elements, such as the focusing circuit, the exposure assembly, are mounted on the main circuit board. The CPU is electronically connected to the focusing circuit, the exposure assembly, and the zoom code input circuit, and performs general various operations of the digital camera, such as photometering, automatic focusing (AF) etc. The CPU carries out a predetermined operation in response to usage of the shutter button 16 and the exposure assembly.

The locating post 11 is fixed to the housing 10 and configured for locating the rotatable assembly 12, the elastic element 13, the contact sheet 14, and the pivot release 15.

Figure 3:
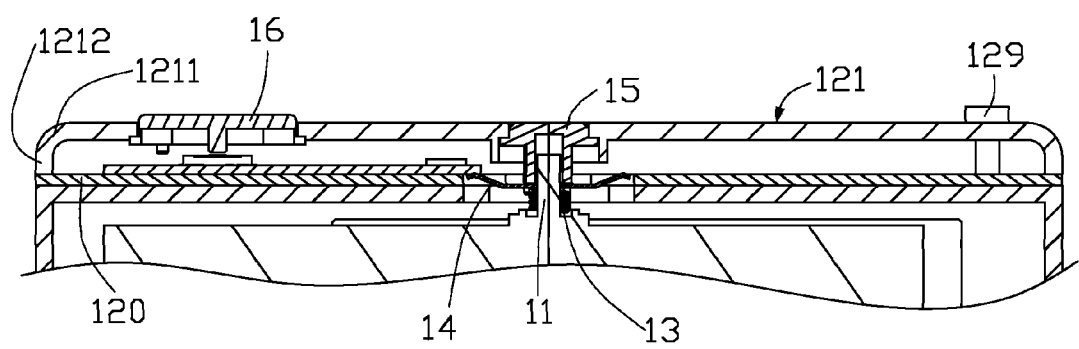
FIG. 3 is a partial, cross-sectional view of the digital camera of FIG. 1A, taken along the line III-III.
Figure 4:
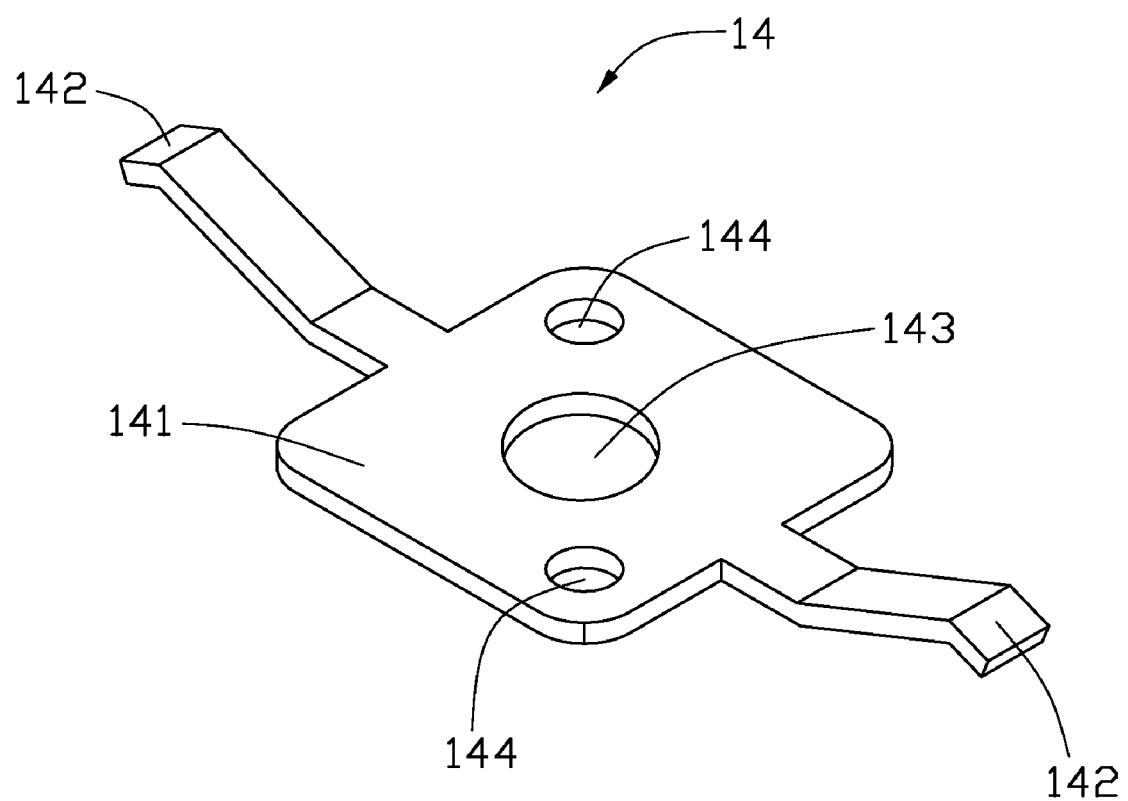
FIG. 4 is an isometric view of a contact sheet of the digital camera of FIG. 1A.

Referring also to FIG. 3 and FIG. 4, the rotatable assembly 12 includes a base 120, a cover 121 covering the base 120, and a circuit board 122. The base 120 defines a base hole 123 therein for passage of the locating post 11 and the pivot release 15. The base hole 123 includes a main opening 124 and two branch slots 125 respectively extending from two opposite sides of the main opening 124. The locating post 11 passes through the main opening 124. The cover 121 includes a cover base 1211, a sidewall 1212 integrally formed with the cover base 1211, a cover hole 1213 defined in the base 1211, and a shutter opening 1214. The sidewall 1212 is perpendicular to the cover base 1211 and forms a receiving chamber (not labeled) together with the cover base 1211 and the base 120 for containing the circuit board 122. The cover hole 1213 is configured for passage of the locating post 11. The shutter opening 1214 is configured for passage of the shutter button 16. The circuit board 122 is interposed between the base 120 and the cover 121, and has a pad 126 configured for electronically contacting with the shutter button 16 to trigger the exposure assembly. The rotatable assembly 12 may be fixed to the housing through some conventional method known in the art, such as screws 129, when the position of the shutter button 16 is determined.

The elastic element 13 may be a coil spring and wraps around a portion of the locating post 11 thereby pushing the contact sheet 14 along the locating post 11 to a predetermined position.

The contact sheet 14 is interposed between the elastic element 13 and the pivot release 15 and includes a body 141 and two spring fingers 142 respectively extending from two opposite sides of the body 141. The body 141 and the two spring fingers 142 have different planes for tilting towards the pivot release 15. Generally, the two springs fingers 142 are respectively received in the two branch slots 125 of the base 120 and electrically contact with the circuit board 122. Once the pivot release 15 presses the body 141 of the contact sheet 14 downwardly, the two spring fingers 142 are disengaged from the circuit board 122. Thus, the rotatable assembly 12 can be rotated to change the location of the shutter button 16. The contact sheet 14 also include an opening 143 for passage of the locating post 11 and at least one locating hole 144 for locating the contact sheet 14 in cooperation with the pivot release 15. In the present embodiment, the contact sheet 14 includes two locating holes 144.

Figure 5:
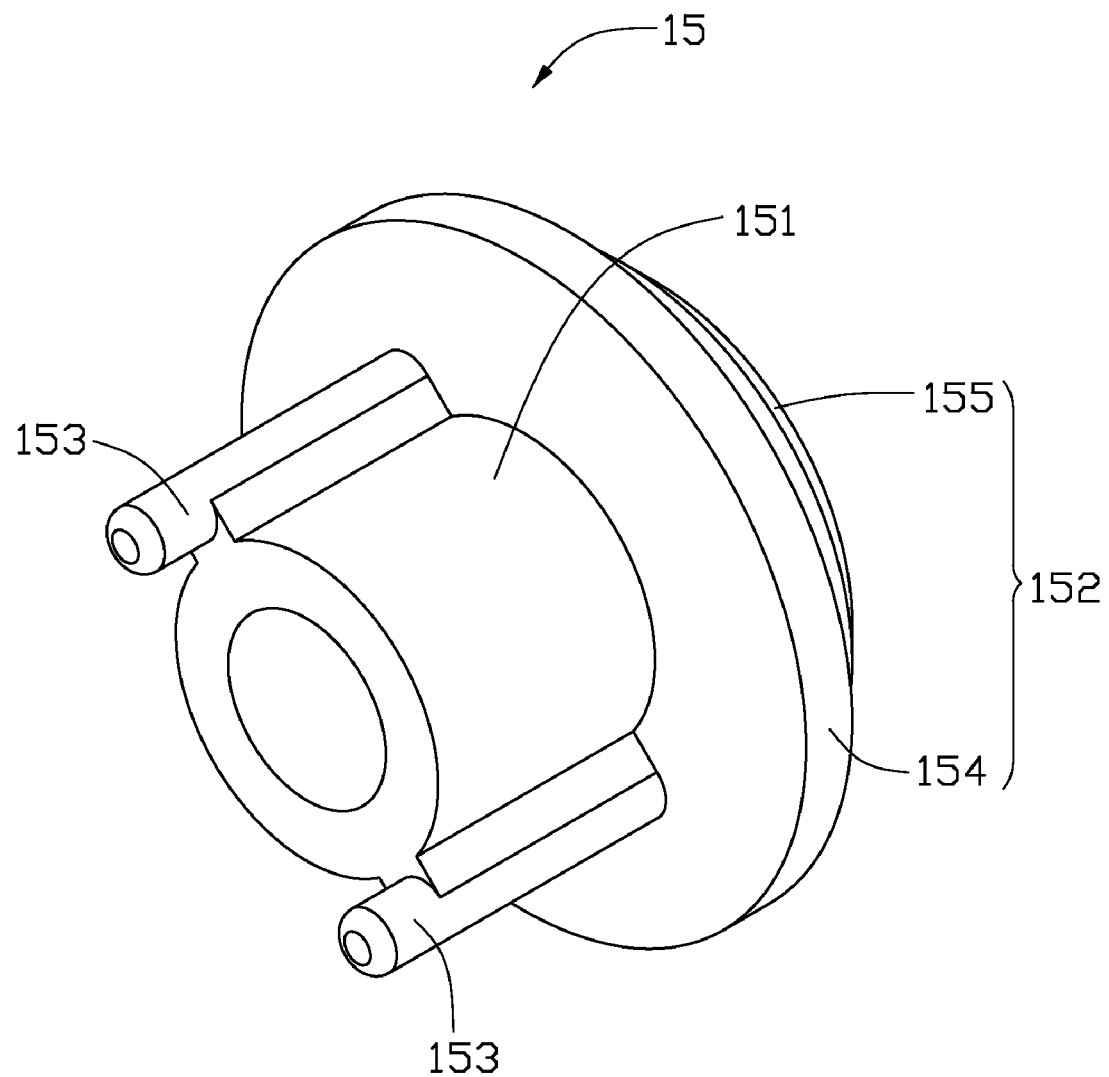
FIG. 5 is an isometric view of the pivot release of the digital camera of FIG. 1A.

Referring also to FIG. 5, the pivot release 15 caps the locating post 11 and includes a cylinder-shaped portion 151, a pressing portion 152 connected to the cylinder-shaped portion 151, and two protruding pins 153. The cylinder-shaped portion 151 passes through the cover hole 1213 and the main opening 124 of the base hole 123, and contacts the body 141 of the contact sheet 14. The pressing portion 152 including an enlarged portion 154 and a narrow portion 155 connected to the enlarged portion 154. The dimension of the enlarged portion 154 is greater than that of the cover hole 1213 and the main opening 124 such that the enlarged portion 154 can be clamped and contained between the base 120 and the cover 121 to locate the pivot release 15. The two protruding pins 153 have a greater length than that of the cylinder-shaped portion 151 and are inserted into the corresponding locating holes 144 for further locating the contact sheet 14.

The shutter button 16 can be either left side or the right side of the camera via rotatable assembly 12 for right-handed of left-handed users to use. The shutter button 16 is electronically connected to a shutter of the lens assembly. When the shutter button 16 is located at the left side of the digital camera 100, it is convenient for left-handed users to operate the digital camera 100 and when it is at the right side of the digital camera 100, the shutter button 16 is convenient for right-handed users to operate.

As described above, the rotatable assembly 12 may help users to select one of the left side and the right side of the digital camera 100 as desired for left-handed or right-handed operation of the digital camera 100.

It should be understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A digital camera, comprising:
    a housing;
    an exposure assembly accommodated within the housing;
    a locating post fixed to the housing;
    an elastic element wrapping round a portion of the locating post;
    a pivot release capping a distal end of the locating post;
    a contact sheet interposed between the elastic element and the pivot release and comprising a body, and two spring fingers respectively extending from two opposite sides of the body, the body defining an opening therein for passage of the locating post, the two spring fingers being tilted towards the pivot release;
    a rotatable assembly mounted on the top of the housing, the rotatable assembly comprising a base, a cover, and a circuit board interposed between the base and the cover, the circuit board defining a main opening for passage of the locating post, the base defining a base opening for passage of the locating post therein, the cover covering the base and defining a cover hole for passage of the locating post therein, the circuit board being electrically connected to the exposure for triggering the exposure assembly to expose, the rotatable assembly being rotatable about the locating post, two branch slots respectively extending from two opposite sides of the main opening for passage of the two spring fingers to contact the circuit board, wherein the pivot release is configured for pressing out of the two spring fingers from two branch slots, the circuit board is electrically connected to the exposure assembly via one of the two spring fingers of the contact sheet, selectively; and
    a shutter button disposed on a side of the rotatable assembly, being movable along the extending direction of the locating post, and electrically connected to the exposure assembly through the circuit board for triggering the exposure assembly to expose, and the shutter button can be position the right and left side by rotating the rotatable assembly to accommodate right-handed and left-handed users.

2. The digital camera as claimed in claim 1, wherein the pivot release comprises a cylinder-shaped portion for receiving the end of the locating post and a pressing portion connected to the cylinder.

3. The digital camera as claimed in claim 2, wherein the cover defines a shutter opening for passage of the shutter button.

4. The digital camera as claimed in claim 1, wherein the pivot release comprises one or more protruding pins, the body of the contact sheet defining correspondingly one or more locating holes for insertion of the protruding pins to position the relational location between the pivot release and the contact sheet.

5. The digital camera as claimed in claim 1, wherein the elastic element comprises a coil spring.

6. The digital camera as claimed in claim 1, wherein an end of the elastic element is fixed to the housing.

7. The digital camera as claimed in claim 1, further comprising a main circuit board received in the housing and electronically connected to the shutter button and the exposure assembly via one of the two spring fingers.

* * * * *